No. 620,734. Patented Mar. 7, 1899.
W. P. BULLIVANT.
TORPEDO NET.
(Application filed Dec. 23, 1898.)
(No Model.)
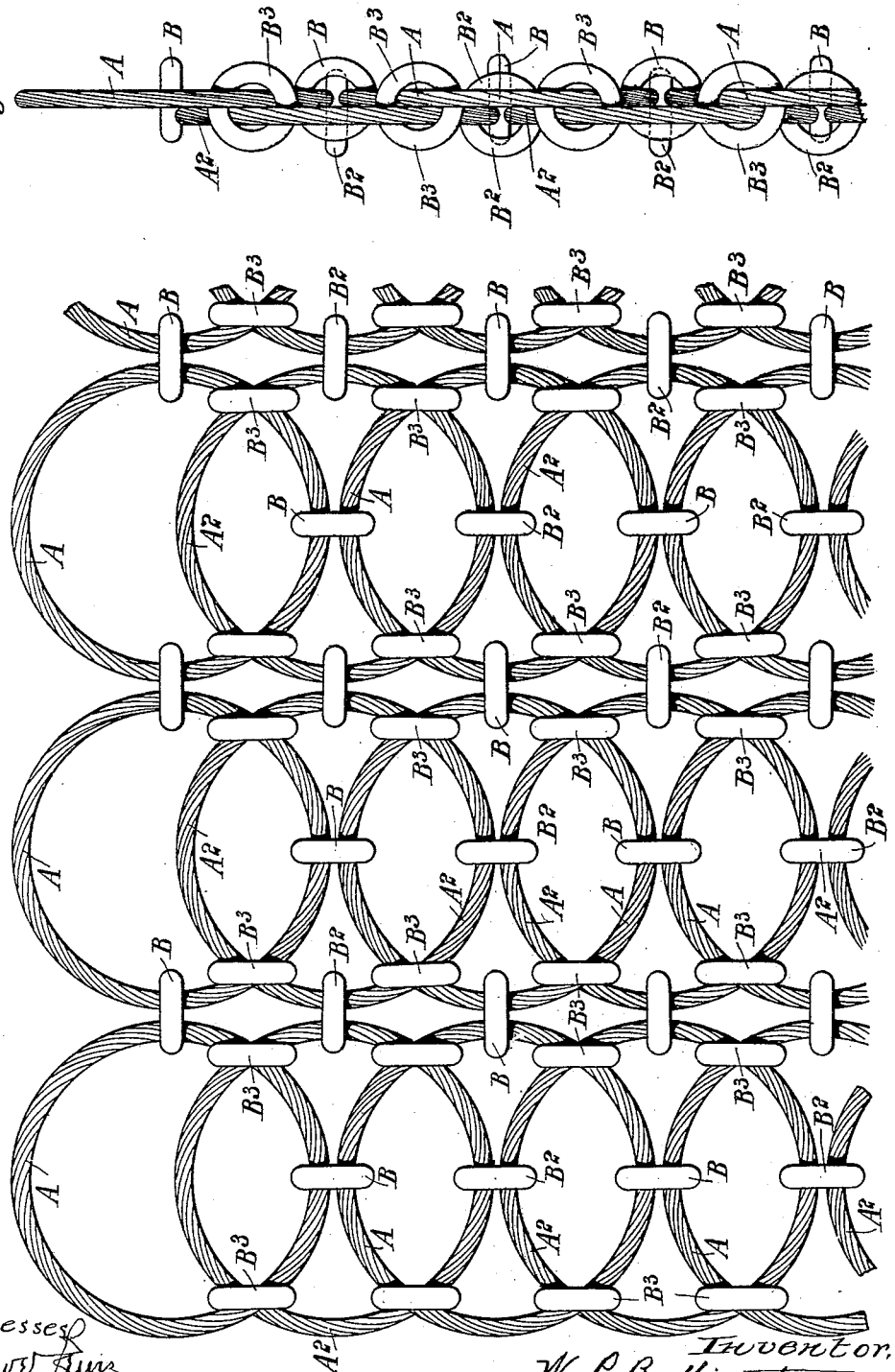

United States Patent Office.

WILLIAM PELHAM BULLIVANT, OF LONDON, ENGLAND.

TORPEDO-NET.

SPECIFICATION forming part of Letters Patent No. 620,734, dated March 7, 1899.

Application filed December 23, 1898. Serial No. 700,124. (No model.)

*To all whom it may concern:*

Be it known that I, WILLIAM PELHAM BULLIVANT, wire-rope maker, a subject of the Queen of Great Britain and Ireland, and a resident of 72 Mark Lane, in the city of London, England, have invented certain new and useful Improvements in Torpedo-Nets, (for which I have applied for a patent in Great Britain, No. 16,128, dated July 23, 1898,) which improvements are fully set forth in the following specification.

My invention relates to the construction of torpedo-nets, and has for its object to reduce the size of the apertures in the net without unduly increasing the weight of the net. In order to effect this, I arrange the gromets of the net so that they overlap each other, and I connect them together by rings which are worked in in proper position during the making of each gromet.

In the accompanying drawings, Figure 1 represents a face view, and Fig. 2 an end view, of a part of a torpedo-net made in accordance with my invention.

The gromets A overlap the gromets $A^2$, so that there are in the example shown two layers of gromets, as shown clearly in Fig. 2. The said gromets are preferably made of wire worked into the rings which connect them to each other, as illustrated clearly in Fig. 1. The rings B connect the gromets A together, the rings $B^2$ connect the gromets $A^2$ together, and the rings $B^3$ connect the gromets A and $A^2$ together. By this means I considerably reduce the size of the open spaces throughout the net, and this may be done to such an extent that the said spaces are, say, only about one-third of the spaces in each particular gromet.

I claim—

A torpedo-net made of gromets which overlap each other so that there are layers of gromets, the gromets of each layer being connected to each other by rings and the layers being also connected to each other by rings.

In testimony whereof I have signed this specification in the presence of two subscribing witnesses.

W. PELHAM BULLIVANT.

Witnesses:
WILLIAM ROPER,
WILLIAM WATSON.